(12) United States Patent
Chen

(10) Patent No.: US 9,706,261 B2
(45) Date of Patent: *Jul. 11, 2017

(54) DETECTING CHANNEL CHANGE IN AUTOMATIC CONTENT RECOGNITION FINGERPRINT MATCHING

(71) Applicant: Sorenson Media, Inc., Draper, UT (US)

(72) Inventor: Juikun Chen, West Jordan, UT (US)

(73) Assignee: Sorenson Media, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 15/266,524

(22) Filed: Sep. 15, 2016

(65) Prior Publication Data

US 2017/0013324 A1 Jan. 12, 2017

Related U.S. Application Data

(63) Continuation of application No. 14/815,256, filed on Jul. 31, 2015, now Pat. No. 9,516,377.

(Continued)

(51) Int. Cl.
*H04N 21/81* (2011.01)
*H04N 21/44* (2011.01)
(Continued)

(52) U.S. Cl.
CPC ..... *H04N 21/812* (2013.01); *G06F 17/30327* (2013.01); *H04N 21/222* (2013.01);
(Continued)

(58) Field of Classification Search
CPC .................. H04N 21/44204; H04N 21/44213
See application file for complete search history.

(56) References Cited

U.S. PATENT DOCUMENTS

| 6,909,837 B1 | 6/2005 | Unger |
| 7,444,659 B2 | 10/2008 | Lemmons |

(Continued)

OTHER PUBLICATIONS

International Search Report and Written Opinion mailed Aug. 22, 2016, for International Patent Application No. PCT/US16/34401, 8 pages.

(Continued)

*Primary Examiner* — Olugbenga Idowu
(74) *Attorney, Agent, or Firm* — Honigman Miller Schwartz and Cohn LLP

(57) ABSTRACT

The disclosed system and method receives, from a media device, a query fingerprint that includes an ordered sequence of frames of content being consumed, and matches the query fingerprint with frame fingerprints by determining a distance between respective frame fingerprints and corresponding ones of the ordered sequence of frames. The matching may be performed by populating a binary tree structure with respective distances, chronologically across leaf nodes of the binary tree structure, and then noting a value of the root node. If below a maximum threshold, then there is a match. The system and method may detect a channel change at the media device by traversing a right or a left sub-tree of the binary tree structure, and locating a low value (or a zero) at the first or second nodes of the sub-tree. This channel change may be useful in targeting media to content being streamed to the media device.

20 Claims, 9 Drawing Sheets

Related U.S. Application Data

(60) Provisional application No. 62/175,145, filed on Jun. 12, 2015.

(51) Int. Cl.

| | |
|---|---|
| G06F 17/30 | (2006.01) |
| H04N 21/8352 | (2011.01) |
| H04N 21/431 | (2011.01) |
| H04N 21/234 | (2011.01) |
| H04N 21/2668 | (2011.01) |
| H04N 21/24 | (2011.01) |
| H04N 21/222 | (2011.01) |
| H04N 21/442 | (2011.01) |
| H04N 21/488 | (2011.01) |
| H04N 21/835 | (2011.01) |

(52) U.S. Cl.
CPC ... *H04N 21/23424* (2013.01); *H04N 21/2407* (2013.01); *H04N 21/2668* (2013.01); *H04N 21/4312* (2013.01); *H04N 21/44008* (2013.01); *H04N 21/44016* (2013.01); *H04N 21/44222* (2013.01); *H04N 21/4882* (2013.01); *H04N 21/835* (2013.01); *H04N 21/8352* (2013.01)

(56) References Cited

U.S. PATENT DOCUMENTS

| | | | |
|---|---|---|---|
| 7,546,619 B2 | 6/2009 | Anderson et al. | |
| 2004/0062208 A1* | 4/2004 | Brown | H04L 45/7457 370/256 |
| 2005/0249080 A1 | 11/2005 | Foote et al. | |
| 2011/0238493 A1 | 9/2011 | Ghosh et al. | |
| 2011/0264516 A1 | 10/2011 | Lang et al. | |
| 2012/0005029 A1 | 1/2012 | Lang et al. | |
| 2012/0036023 A1 | 2/2012 | Das et al. | |
| 2013/0031582 A1 | 1/2013 | Tinsman et al. | |
| 2013/0085865 A1 | 4/2013 | Zhou et al. | |
| 2013/0086006 A1* | 4/2013 | Colgrove | G06F 3/0688 707/692 |
| 2013/0104179 A1 | 4/2013 | Shah | |
| 2013/0205315 A1 | 8/2013 | Sinha et al. | |
| 2014/0007162 A1 | 1/2014 | Harrison | |
| 2014/0074621 A1 | 3/2014 | Chai et al. | |
| 2014/0196085 A1 | 7/2014 | Dunker et al. | |
| 2015/0073967 A1 | 3/2015 | Katsuyama et al. | |
| 2015/0163545 A1* | 6/2015 | Freed | H04N 21/44008 725/19 |

OTHER PUBLICATIONS

López-Nores, Martin, et al., "MiSPOT: Dynamic Product Placement for Digital TV through MPEG-4 Processing and Semantic Reasoning," Knowledge and Information Systems at 22, No. 1, pp. 101-128 (2009).

Gracenote, "Gracenote Takes on Targeted Advertising," at http://www.gracenote.com/events/targeted_advertising/, accessed Nov. 6, 2014, 3 pages.

\* cited by examiner

US 9,706,261 B2

DETECTING CHANNEL CHANGE IN AUTOMATIC CONTENT RECOGNITION FINGERPRINT MATCHING

CROSS-REFERENCE TO RELATED APPLICATION

This application is a continuation of U.S. application Ser. No. 14/815,256, filed Jul. 31, 2015, the entire disclosure of which is incorporated herein by this reference. U.S. application Ser. No. 14/815,256 claims the benefit of U.S. Provisional Application No. 62/175,145, filed Jun. 12, 2015, the entire disclosure of which is incorporated herein by this reference.

BACKGROUND

Media consumption devices, such as smart televisions (TVs), may access broadcast digital content and receive data, such as streaming media, from data networks (such as the Internet). Streaming media refers to a service in which media content such as movies or news may be provided to an end user over a telephone line, cable, Internet, and so forth upon request. For example, a user may view a movie without having to leave their residence. Also, users may access various types of educational content, such as video lectures, without having to physically attend at a school or educational institution.

As the number of media consumption devices continues to increase, video content generation and delivery may similarly increase. With an increase in use of media consuming devices (such as smartphones, tablets, and smart televisions) to access streaming media, content or network providers (such as local broadcasters, multi-channel networks, and other content owners/distributors) may distribute contextually-relevant material to viewers that are consuming streaming media (e.g., media programs). For example, local broadcasters may include contextually-relevant advertisements and interactive content with streaming media.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1:
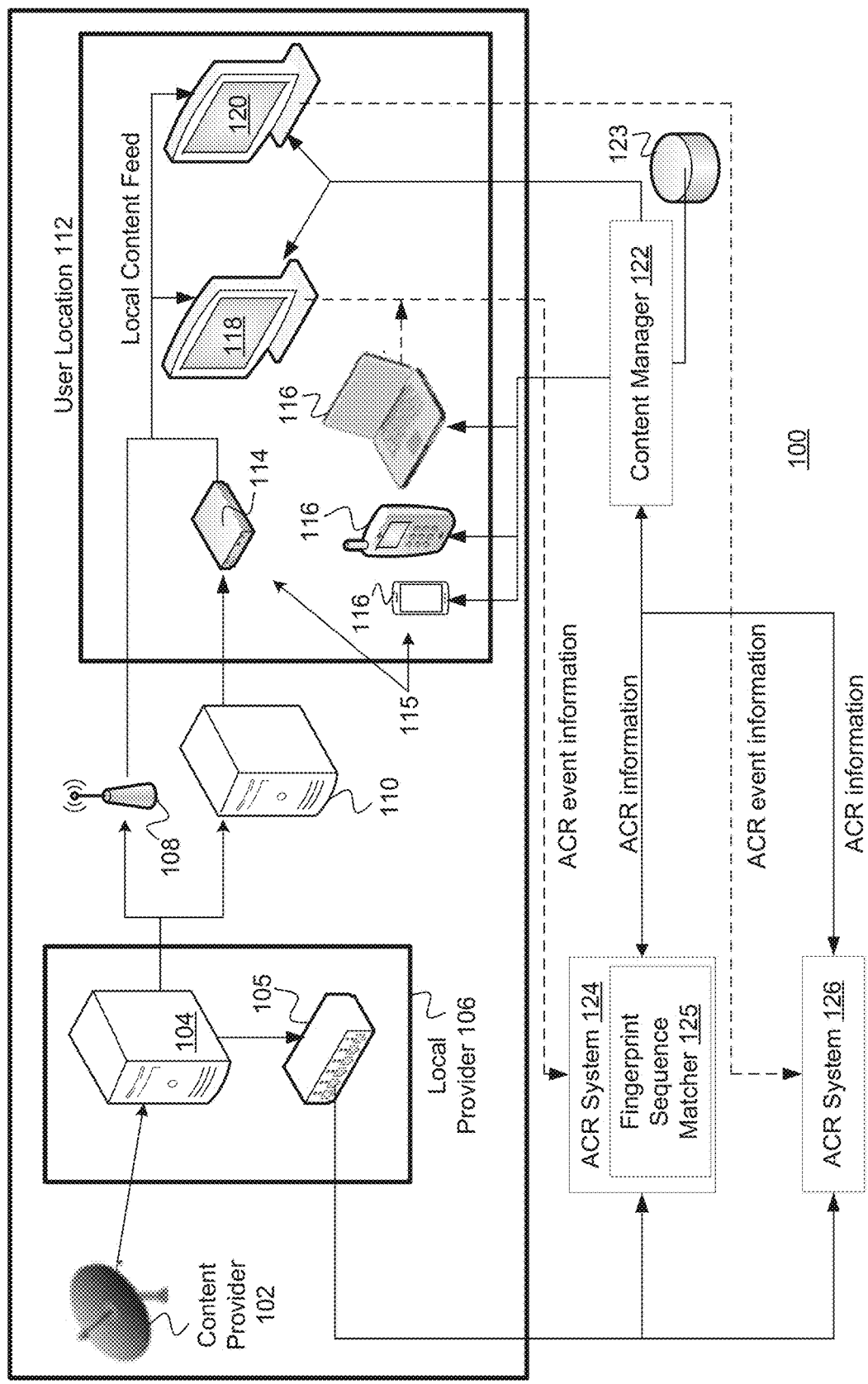
FIG. 1 illustrates a system diagram of a content distribution network according to one embodiment.

Media content broadcasting or streaming, such as television (TV) or internet show broadcasting, can be an engaging venue to advertise products and services, provide information to viewers, or any combination thereof. Accordingly, broadcasters want to know what programs individual viewers are watching, and when, so that subject matter of those programs may be used to accurately target advertising and other useful, optionally non-commercial information to the viewers. Non-commercial may include, for example, news alerts, announcements or educational information. It would therefore be advantageous to determine a program a user is watching or is about to watch, and to send an identification of the program information to an advertising ("ad") targeter or server for use in such targeting actions. In furthering such targeting actions, it is advantageous to detect a channel change quickly so as not to miss targeting opportunities that may follow closely after the channel change.

The disclosed system and method receives, from a media device, a query fingerprint that includes an ordered sequence of frames of content being consumed by a user. The system and method matches the query fingerprint with frame fingerprints, which are stored by the system for individual frames of programs streaming to a plurality of television channels, by determining a distance between respective frame fingerprints and corresponding ones of the ordered sequence of frames. A distance may include, for example, a numerical value indicating how different the two frames are from each other or a difference between channels on which the two respective frames are being streamed. In another embodiment, the distance is derived by summing the absolute distance of each frame pair between two fingerprints.

Matching a query fingerprint with a fingerprint from a known program or channel may be performed by populating a binary tree structure with respective distances (between respective frames) chronologically across leaf nodes of the binary tree structure, and then noting a value of the root node. When the value is below a preset maximum threshold, then there is a match. In one example, the maximum threshold is a small number or zero, e.g., indicating very little difference and a statistically close match.

Populating the binary tree structure may occur by populating the respective distances between the respective frame fingerprints and the ordered sequence of frames from left to right (or right to left) across the leaf nodes (or first children) of the binary tree structure. Parents then take on the sum or addition of the value of their two children as the binary tree structure is populated going up to the root node, as will be discussed in more detail.

In some cases, a television channel may be changed partway through the ordered sequence of frames of the query fingerprint, e.g., during a transition of changing from a first to a second channel. This may result in a medium value at the root node, thus indicating a mismatch, although the latter part of the ordered sequence of frames of the query fingerprint may actually match the frame fingerprints of the originating content. The system and method may detect a channel change at the media device by traversing a right (or a left) sub-tree of the binary tree structure, and locating a threshold low value (or a zero) at the first or second node of the sub-tree. A channel streaming media content matching the ordered sequence of frames of the query fingerprint at the end of the ordered sequence of frames may then be considered the new (or second) channel. Detecting the channel change may be useful in targeting media to content being streamed to the media device as quickly as possible and continuously despite channel changes.

The system and method may send an identification of the channel to an advertising server and receive, from the advertising server, an advertisement contextually-relevant to a subject matter of a media program being played on that channel. The system and method may then deliver the advertisement (or other content) to the media device for display as an overlay or as a replacement advertisement (or informational segment) during a break (e.g., a certain slot or position) in the media program.

To provide viewers with media content, an individual or an organization may stream the media content to viewers, such as by delivering the media content over the Internet to the viewers. The media content used by the individual or the organization may be media content (such as video data) acquired from one or more live broadcast media feeds. For example, a media content provider may provide a user with a linear media channel (e.g., media provided from a live media feed source to a viewer) over the Internet.

The word "content" may be used to refer to media or multimedia. The word "content" may also be a specific term that means the subject matter of the medium rather than the medium itself. Likewise, the word "media" and some compound words that include "media" (e.g. multimedia, hypermedia) are instead referring to content, rather than to the channel through which the information is delivered to the end user/audience. Media or media content may include graphical representations, such as: videos, films, television shows, commercials, streaming video, and so forth; text; graphics; animations; still images; interactivity content forms; and so forth. An example of a type of content commonly referred to as a type of media is a "motion picture" referred to as "a film."

In one embodiment, a content overlay system or a content overlay device may enable combining media content with specific, timely, and/or targeted overlay content such as advertising. The content overlay system or content overlay device may enable overlay content providers to engage with viewers by inviting the viewers to respond to a call to action within the content overlays (e.g., an invitation to engage the content overlay). One advantage of inviting the viewers to a call to action may be to provide a return path or follow-up path for the viewers to request additional information, ask questions, provide input, contact a provider of a service or product advertised, and so forth. Another advantage of inviting the viewer to a call to action may be to provide a return path or follow up path for the advertisers to provide additional information, further engage the viewers, gather additional information about the viewers, answer viewer questions about the product or service advertised, and so forth. In another example, the content overlay system or the content overlay device may enable an advertiser to use cross platform retargeting campaigns once a viewer has viewed and/or interacted with an overlay content of a media program.

FIG. 1 illustrates a system diagram of a content distribution network 100 according to one example. In the content distribution network 100, a content provider 102 may broadcast a content feed to a local provider 106. The local provider 106 may include a headend 104 and an automatic content recognition (ACR) fingerprinter server 105. The content feed from the content provider 102 may be received at the headend 104 of the local provider 106. The headend 104 may generate a local content feed based on the received content feed. For example, the headend 104 may be a local affiliate broadcaster receiving a network channel with programming and advertisements from a national or global broadcaster.

The headend 104 may communicate the local content feed to the ACR fingerprinter server 105, an over-the-air (OTA) broadcaster 108, and/or a multichannel video programming distributor (MVPD) 110. The OTA broadcaster 108 and/or the MVPD 110 may communicate the local content feed to a media device 115. Some examples of the media devices 115 include client devices 118 and 120, a set top box 114 that streams provider content to the client devices 118 and 120, as well as other devices 116 through which the user may stream the local content feed, e.g., wirelessly.

In one example, the OTA broadcaster 108 may broadcast the local content feed using traditional local television or radio channels. In this example, the client devices 118 and 120 may include antennas (such as TV or radio antennas) and receive the local content feed. In another example, the MVPD 110 (such as cable or satellite broadcaster) may communicate the local content feed to a set top box 114. In this example, the set top box 114 may format the content feed for the client devices 118 and 120 and may communicate the formatted content feed to the client devices 118 and 120. The client devices 118 and 120 may include a display device, such as a television screen or a touch screen, to display the local content to a viewer. Various components of the content distribution network 100 may be integrated or coupled to the client devices 118 and 120. For example, a smart television may include the antennas, the set top box 114, and a display device in a single unit.

The ACR fingerprint server 105 may analyze the local content feed and determine fingerprint information (e.g., fingerprints). The ACR fingerprint server 105 may communicate the fingerprints to ACR systems 124 and/or 126. The ACR systems 124 and 126 may be different ACR systems selected by device manufacturers, such as smart TV manufacturers. In some embodiments, as described below, the ACR system 124 includes an ACR fingerprint sequence matcher 125. The ACR fingerprint sequence matcher 125 may match frame fingerprints to the original video content from which the corresponding video frames originate. The ACR system 126 may or may not have the ACR fingerprint sequence matcher 125. Details regarding the ACR fingerprint sequence matcher 125 are described below with respect to FIG. 3.

The ACR fingerprint server 105 may analyze the local content feed and capture fingerprints, which may include an ordered sequence of frames from the local content feed. The ACR fingerprint server 105 may communicate the fingerprints to the ACR systems 124 and/or 126. The ACR systems 124 and 126 may be different ACR systems selected by device manufacturers, such as smart TV manufacturers. In one example, the ACR fingerprint server 105 may format fingerprints for the different ACR systems 124 and 126, e.g., that include different types of fingerprinting technology such as different fingerprinting algorithms. The ACR systems 124 and 126 may establish communication connections with the different media devices 115, including the client devices 118 and 120, respectively. The client devices 118 and 120 may communicate fingerprint information to the ACR systems 124 and 126, respectively. When the ACR system 124 or 126 receives ACR fingerprint information from the client devices 118 and/or 120, the ACR system 124 or 126 may match the received fingerprints with those generated by the ACR fingerprint server 105 and when a match occurs and the content has been identified, may communicate ACR events to a content manager 122.

In another example, the ACR systems 124 and 126 may receive ACR fingerprint information from the client devices 118 and 120 and may match the received fingerprints with those generated by the ACR fingerprint server 105. When a match occurs and the content has been identified, the ACR systems 124 and/or 126 may notify the client device 118 or 120 of the ACR events and then the client device 118 or 120 may communicate those ACR events to a content manager 122. Alternatively, or additionally, the ACR systems 124 and/or 126 may directly communicate the ACR events to the content manager 122. The ACR fingerprint information may include: a display of advertisements in the local content feed to a viewer, a display of selected or flagged content in the local content feed to a viewer, a change of content channel at the client device 118 or 120, and so forth.

The event information from the different ACR systems 124 and 126 may be in different formats and the content manager 122 may normalize the data into a common format before storing the data into a database 123. For example, the content manager 122 may receive disparate data sets from the ACR systems 124 and 126 that include similar but not identical data, such as data with the same content but formatted differently. The content manager 122 may process and reformat the disparate data sets to create a single data model or format (e.g., reformatted data sets) and the reformatted data sets may be populated into the database 123 in the content manager 122.

In one embodiment, to normalize disparate data sets from ACR systems 124 and 126, the content manager 122 may cleanse or filter data in the data sets. For example, some data sets may contain fields or data that may be irrelevant to the content manager 122. In this example, the content manager 122 may cleanse or filter the irrelevant data (e.g., the data may be removed or ignored). In another example, some data sets may include instances of incomplete or incorrect data or data sets and the content manager 122 may cleanse or filter the incomplete or incorrect data or data sets. In another embodiment, to normalize the disparate data sets from ACR systems 124 and 126, the content manager 122 may map fields of the data sets. For example, when the content manager 122 receives a first data set from the ACR system 124 and a second data set from the ACR system 126, at least some of the data fields of the first data set and the second data set may be common to both the first and second data set. However, the common data fields may be located at different places in the first and second data sets. In this example, the content manager 122 may map the different data fields of the first and second data sets to normalized fields and have the same data fields in the same data field locations in the database 123.

In another embodiment, to normalize disparate data sets from the ACR systems 124 and 126, the content manager 122 may derive data from the data sets. For example, data from the ACR systems 124 and/or 126 may not contain all of the fields that are needed to fill the data fields in the database. However, the content manager 122 may use other fields in the data sets from the ACR systems 124 and 126 to derive data for these data fields.

In one example, the database 123 may include data fields for such as a state in a country field, a designated market area (DMA), and a county and/or city field but the data sets from the ACR systems 124 and 126 may only include zone improvement plan (ZIP) codes. In this example, the content manager 122 may use the ZIP codes to derive data for the fields in the database. In another example, the data set may not contain any geographic location information, but may include an internet protocol (IP) address of the ACR systems 124 and 126. In this example, the content manager 122 may use a geo-IP lookup service to derive the state, DMA, county, city and ZIP code information.

In another example, the database 123 may include demographic fields such as an age field, a gender field, a household income field, and so forth. However, the data sets from the ACR systems 124 and 126 may not include the demographic fields or demographic data. In this example, the ACR systems 124 and 126 may provide the content manager 122 with the IP address of the client devices 118 and 120. The content manager 122 may use the IP addresses to determine the demographic data to populate the data fields in the database.

In another example, a field in a first data set from the ACR system 124 may include local time zone information, such as a mountain daylight time (MDT) zone, and a second data set from the ACR system 126 may include information from another time zone, such as a coordinated universal time (UTC) zone. The database may store all data using the UTC and the content manager 122 may convert the local time to UTC before storing the data in the database 123.

In one embodiment, the content manager 122 may use the normalized data to generate reports or data (viewing data) about user viewing behavior across different ACR technology vendors and smart TV or other Internet-connected video devices. The content manager 122 and the media devices 115 may include communications interfaces to communicate information, such as overlay content, between the media devices 115 and the content manager 122.

In one example, the communication interface may communicate the information using a cellular network and/or a wireless network. In one example, the communications network may be a cellular network that may be a third generation partnership project (3GPP) release 8, 9, 10, 11, or 12 or Institute of Electronics and Electrical Engineers (IEEE) 802.16p, 802.16n, 802.16m-2011, 802.16h-2010, 802.16j-2009, 802.16-2009. In another embodiment, the communications network may be a wireless network (such as a network using the Wi-Fi® technology developed by the Wi-Fi Alliance) that may follow an IEEE® standard developed by the Institute of Electrical and Electronics Engineers, Inc., such as the IEEE 802.11-2012, IEEE 802.11ac, or IEEE 802.11ad standards. In another embodiment, the communications network may be a Bluetooth® connection developed by Bluetooth Special Interest Group (SIG) such as Bluetooth v1.0, Bluetooth v2.0, Bluetooth v3.0, or Bluetooth v4.0. In another embodiment, the communications network may be a Zigbee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In one example, the content manager 122 may also instruct the media devices 115 to replace portions of the local content feed received from the OTA broadcaster 108 or the MVPD 110 with overlay content. In another example, the content manager 122 may instruct the media devices 115 to overlay or superimpose overlay content onto portions of the local content feed. The content manager 122 may aggregate ACR information across multiple ACR systems 124 and 126 and may communicate overlay content to different client devices 118 and 120, where the client devices 118 and 120 may be from different device manufacturers.

The content manager 122 may also establish communication connections with other devices 116 categorized generally media devices 115. In one example, the other device 116 may communicate with the client devices 118 or 120 and provide an additional screen (e.g., a second screen) to display overlay content. For example, the client devices 118 and 120 may receive the local content feed from the OTA broadcaster 108 or the MVPD 110 and display the local content feed to the user. The other devices 116 may also communicate ACR event information to the ACR systems 124 and 126 when an ACR event occurs, as discussed in the preceding paragraphs. When the content manager 122 receives the ACR event information, the content manager 122 may communicate overlay content to the other devices 116.

In one example, the client devices 118 and 120 may continue to display the local content feed while the other devices 116 display the overlay content. In another example, the client devices 118 and 120 and the other devices 116 may both display the overlay content. In another example, the client devices 118 and 120 and the other devices 116 may display a portion of the overlay content and a portion of the local content feed. In another example, the client devices 118 and 120 and the other devices 116 may display different local content feeds and/or overlay content.

In one example, the client devices 118 and 120 and/or the other devices 116 may display the overlay content at the time the overlay content is received. In another example, the client devices 118 and 120 and/or the other devices 116 may delay displaying the overlay content for a threshold period of time. The threshold period of time may be a predefined period of time or the content manager 122 may select a period of time for the client devices 118 and 120 and/or the other devices 116 to delay displaying the overlay content.

Figure 2:
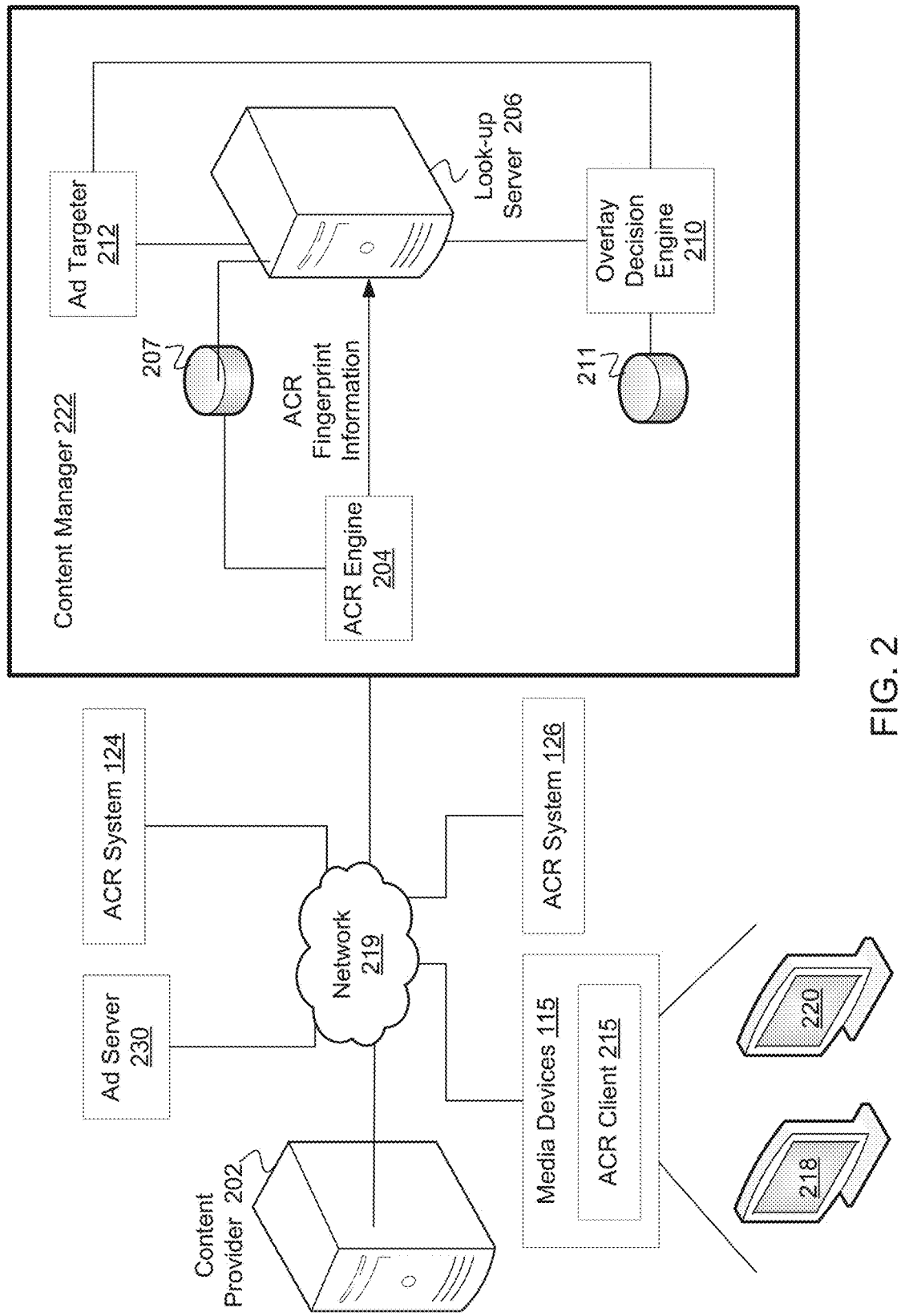
FIG. 2 illustrates a content manager to provide overlay content to a client device according to one embodiment.

FIG. 2 illustrates a content manager 222 to provide overlay content to a media device 115 such as to client devices 218 and/or 220 according to one embodiment. A content provider 202 may stream media content to the media device 115 over a network 219, which streaming may be intercepted by the content manager 222 before, or simultaneously with the streaming of the media content to the media device 115. The content manager 222 may also communicate with an advertisement server (or "ad" server) 230 such as to send the ad server 230 an advertising call that requests an advertisement be served with (or as an overlay to) the media content to target the subject matter of the media content and/or interests of a user as will explained in more detail. The ad server 230 may be a third party or external server that provides advertising or other overlay content to the content manager 222 for later delivery to the media devices 115 or may provide the content directly to the media devices 115 for delivery as overlay or replacement advertisements.

The content manager 222 may include an ACR engine 204, a look-up server 206, an overlay decision engine 210, an overlay database 211 in which to store overlay content, and an ad targeter 212. The content provider 202 may upload media content to the ACR engine 204.

The ACR engine 204 may fingerprint the media content. In one example, fingerprints may be generated by fingerprinting every frame of a feed, every other frame of the feed, a sequence of frames and so forth. For example, the ACR engine 204 may generate a fingerprint for a frame of the feed by performing a discrete cosine transform (DCT) of the frame and designating a subset of the resulting coefficients (e.g., the low-frequency coefficients) as the fingerprint. Additionally, or alternatively, the ACR engine 204 may generate (or identify) a target block of fingerprints that correspond to an ordered sequence of frames of content being streamed to a media device 115. Furthermore, the look-up server 206 may find a matching source block of frame fingerprints stored in a fingerprint database 207 for the originating media programs (e.g., originating content) for which an identity is known.

In another or related embodiment, the ACR engine 204 may also analyze ACR event information to determine what event may have occurred, e.g., a positive match between a sequence-of-frames query fingerprint and frame fingerprints of originating content stored in the ACR system 124 or 126. When there is a positive match, the ACR engine 204 may send a positive match indicator to the requesting media device 115 that may include a media content identifier (ID) that identifies the content for which a positive match results. The media device 115 may send an overlay request to the overlay decision engine 210 requesting a media content overlay. In one example, the overlay request may include the media content ID. In another example, the overlay request may include overlay information or overlay parameters.

With further reference to FIG. 2, the ACR engine 204 may communicate fingerprints to the look-up server 206, which may look up and determine a television program (or channel, for example) and location within the television program corresponding to an ACR event received from the ACR system 124 or 126. Each fingerprint of a segment of the feed may be associated with a time stamp. The time stamp may belong to individual frames of the segment of the feed when received by the ACR engine 204. The time stamp may be a frame number within the feed from an arbitrary starting point. The look-up server 206 may store the fingerprints in association with their respective time stamps (e.g., in the fingerprint database 207), and aid the ad targeter 212 and the overlay decision engine 210 in timing and content targeting within the media content of the feed that the user is viewing.

In one embodiment, the ACR engine 204 interacts with an ACR client 215 at various media devices 115. The ACR client 215 may locally match fingerprints and confirm whether or not the user has changed a channel to watch a different television program, and to report the channel change to the content manager 222. Accordingly, matching of fingerprints may occur locally at the media devices 115 in some cases.

Furthermore, the ACR client 215 may periodically, continuously, or semi-continuously communicate user fingerprint information to the look-up server 206, e.g., in the form of query fingerprints, including target blocks, requesting to confirm the television program or channel being watched on the media device 115. The look-up server 206 may determine when there is a match between the query fingerprint(s) (or target blocks) and a multitude of frame fingerprints, which may be stored as source blocks of fingerprints in the fingerprints database 207 or across the network 219 from the look-up server. The query fingerprint may be an ordered sequence of frames, respective ones of which may be matched with individual ones of the frame fingerprints until finding a sufficient match to be associated with the television program or channel streamed the television program. When there is a positive match, the look-up server 206 may communicate a positive match indicator to the ACR client 215. The ACR client 215 may send an overlay request to an overlay decision engine 210 requesting a media content overlay.

In one example, the overlay request may include a media content identifier (ID). In another example, the overlay request may include overlay information or overlay parameters. In one example, the overlay decision engine 210 may use the content ID, overlay information, and/or overlay parameters to identify targeted overlay content. In another example, the overlay decision engine 210 may use the content ID, overlay information, and/or overlay parameters to identify an overlay format. The overlay decision engine 210 may compare the content ID, overlay information, and/or overlay parameters with an overlay database 211 to identify the targeted overlay content and the overlay format. The overlay database may be updated, by a content provider or an advertiser (e.g., the ad server 230), with new overlay content and overlay formats on a periodic or continuous basis. The overlay content may populate the overlay format (such as an overlay template or the like) before or after being delivered to an overlay position of the streamed media content of the television program of channel.

The ad targeter 212 may track and analyze user interaction with and behavior regarding advertisements and other overlay content delivered to the media devices 115 by the overlay decision engine. The ad targeter 212 may also receive and incorporate user profile information with the analysis of user behavior on a per-media-device basis, to determine subject matter of interest to users. This information and data gathered on a user or group of users may extend to preferred viewing times and typical viewing habits with regards to television programs and the channels typically watched, and when. The ad targeter 212 may then inform the overlay decision engine 210, e.g., in the form of parameters, different subject matters of interest and viewing habits that the overlay decision engine 210 may use in deciding what overlay content to select for delivery to respective users, how to format it and when best to deliver for maximum return on investment of campaign budgets.

When the overlay decision engine 210 identifies the targeted overlay content with the help of the ad targeter 212, the overlay decision engine may return targeted overlay content to the media device 115. In one example, the overlay decision engine 210 may communicate the targeted overlay content directly to the media device 115, such as via a wireless communications network. In another example, the overlay decision engine 210 may communicate the targeted overlay content to the media device 115 via a universal resource locator (URL). In one example, when multiple targeted overlay contents match the content ID, overlay information, and/or overlay parameters, the overlay decision engine 210 may select the targeted content overlay that meets a greatest number parameters or other information. In another example, when multiple targeted overlay contents match the content ID, overlay information, and other overlay parameters, the overlay decision engine 210 may randomly select an overlay content that meets the parameters and other information. In another example, when multiple targeted overlay contents match the content ID, overlay information, and overlay parameters, the overlay decision engine 210 may select predetermined overlay content that matches the content ID, overlay information, and/or overlay parameters. The overlay content may be populated with dynamic content (e.g., content that may be updated or refreshed at periodic intervals). The dynamic content may be stored in a local database or an external system.

The ACR client 215 of the media device 115 may superimpose overlay content over the content feed when the ACR fingerprint information matches the user fingerprint information. In one example, the media device 115 may superimpose overlay content over the content feed in a hypertext markup language (HTML) browser. In another example, the media device 115 may superimpose overlay content over a content feed from an OTA broadcaster or a cable broadcaster. When the overlay content is placed over the content feed, the overlay content may be displayed to the user via a display of the media device 115. In one example, the overlay content may include one or more call-to-action options that may be displayed to a user. In this example, the user may interact with the overlay content using an input device (such as a TV remote, keyboard, a smartphone, or a tablet) to create feedback information. The ACR client 215 may communicate the feedback information to an ad targeter 212. Another individual, such as an advertiser, may access the feedback information and analyze the feedback information to determine desired information, such as user interest in the overlay content.

The ACR client 215 may monitor the content feed to determine when the overlay content and content feed match ceases and/or a threshold period of time expires. In one example, when the overlay content and content feed match ceases or a threshold period of time expires, the media device may cease to superimpose the overlay content for display on the media device 115.

Figure 3:
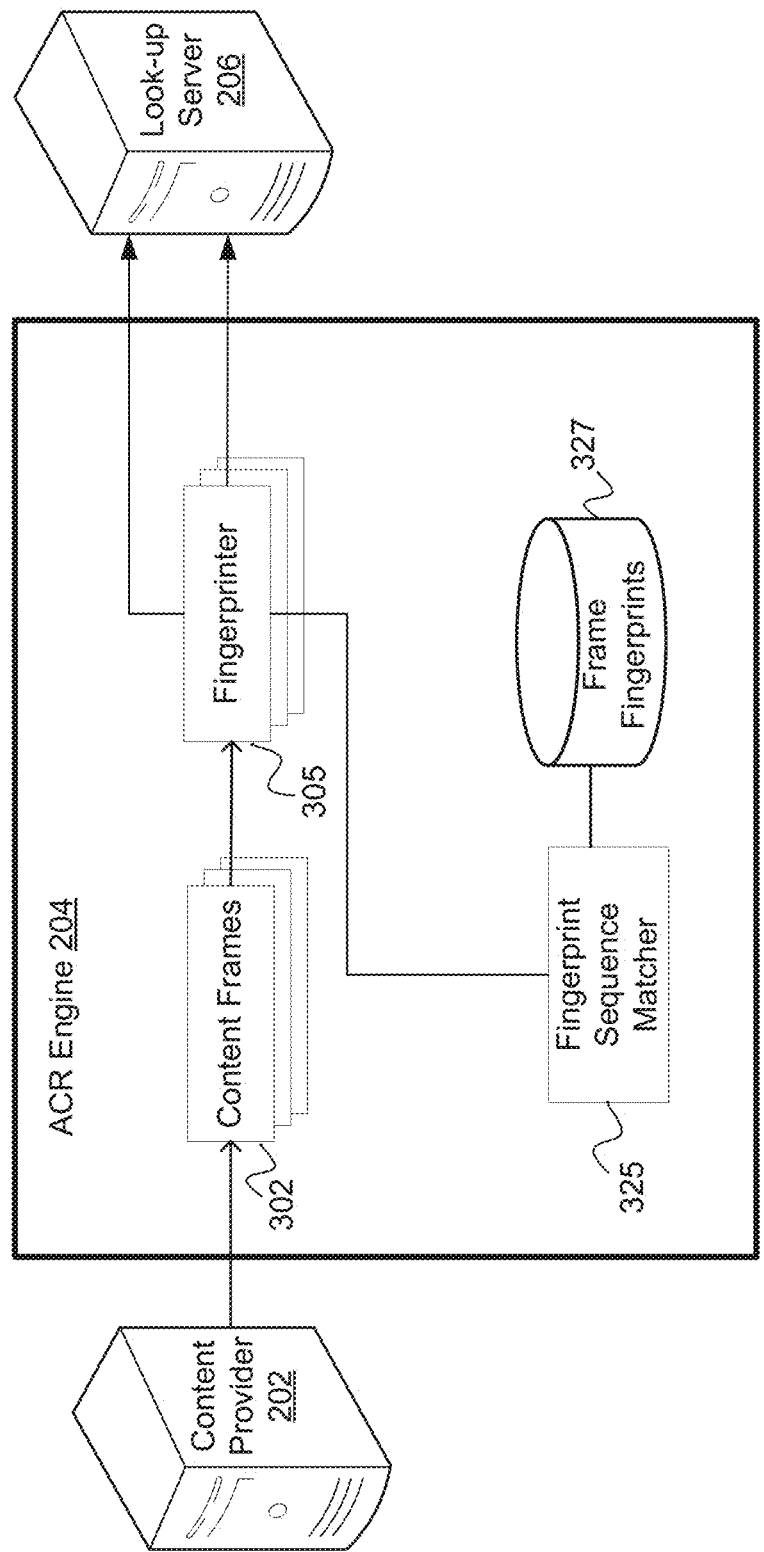
FIG. 3 illustrates a system diagram of an automatic content recognition (ACR) engine used to fingerprint media content for the content manager of FIG. 2.

FIG. 3 is a system diagram of the ACR engine 204 used to fingerprint media content for the content manager of FIG. 2. The ACR engine 204 may receive content frames of the media content to be fingerprinted, a fingerprinter 305, a fingerprint sequence matcher 325 and a database 327 in which are stored frame fingerprints, according to one embodiment. The content provider 202 may generate multimedia content that is streamed to the media devices 115, including the client devices 218 and/or 220.

The fingerprinter 305 may detect or select a number of content frames 302 from the multimedia content as a fingerprint. In one embodiment, the number of content frames 302 may be sequentially ordered (e.g., as a target block), and thus include sequential time stamps from a beginning to an end of the fingerprint. In one example, the content may be audio data, video data, or both. In this example, video content may be raw video frames.

For example, when the fingerprinter 305 receives the content frames 302, the fingerprinter 305 may determine how to process the content frames 302, such as the raw video and/or audio frames to generate the fingerprint. In one example, the frames may be fingerprinted individually. In another example, the frames may be fingerprinted in collections or sequences. The fingerprinter 305 may determine when to fingerprint the frames individually or sequentially based on an ACR algorithm that the fingerprinter 305 executes during fingerprinting, examples of which will be discussed.

Additionally, the fingerprinter 305 may fingerprint the content frames 302 differently for different broadcasters or users. In this example, the fingerprinter 305 may include different ACR fingerprinting algorithms for different ACR vendors. In one example, the different ACR fingerprinting algorithms may be predetermined and stored in memory of the fingerprinter 305.

In yet another example, the different ACR fingerprinting algorithms may be provided by third party ACR vendors. When the different ACR fingerprinting algorithms are provided by such vendors, the fingerprinter 305 may aggregate the different ACR fingerprinting algorithms. In one example, ACR fingerprinting may use raw video with in the YUV 4:2:2 colorspace and at high resolutions or other levels of resolution. When video content is received at the local provider 106 or other content provider 202, the fingerprinter 305 may convert the video content to YUV 4:2:0 colorspace and scale it down in resolution to a threshold resolution level for encoding by a broadcaster or distributor before being sent to the media devices 115.

In some embodiments, the fingerprinter 305 may include, or may communicate with the fingerprint sequence matcher 325. The fingerprint sequence matcher 325 may match a sequence of fingerprints to an original video content from which a given set of individual frame fingerprints originated as described in more detail below.

When the fingerprinter 305 has fingerprinted the content frames 302, the fingerprinter 305 may send fingerprints (including channel information, time codes, and fingerprint information) to the overlay database 211 and/or to a look-up server 206. The look-up server 206 may retrieve the fingerprints and related information from the overlay database 211. The look-up server 206 may also be in communication or coupled with the overlay decision engine 210 and the ad targeter 212, to send overlay and subject matter matching information to the overlay decision engine 210 and the ad targeter 212 with which to contextually target users on the client device 218 or 220.

In one example, the different ACR fingerprinting algorithms may be used on the same content to provide different fingerprint information to look-up servers of different ACR vendors. An advantage of fingerprinting the same content (e.g., content frames) 302 differently may be to provide contextually-relevant advertisements and interactive content to different viewers of media consumption devices. In another example, the content frames 302 may include media content from different feeds. In this example, the different ACR fingerprinting algorithms may be used on the content of the different feeds of the content frames 302 to provide different fingerprinting information to the look-up servers of different ACR vendors.

The different fingerprinting information may be uploaded to the look-up servers of the different ACR vendors, respectively. Different ACR vendors may be integrated on viewing devices manufactured by different contract equipment manufacturers (CEMs). For example, Toshiba televisions may utilize Samba® ACR fingerprinting and Samsung® televisions may use Enswer® ACR fingerprinting. An advantage of the fingerprinter 305 including ACR fingerprinting algorithms for different ACR vendors, may be to fingerprint content provided to viewers via different ACR vendors regardless of the manufacturer of the media consumption device. In one example, the ACR fingerprinting information may be used for digital advertisement replacement (DAR). In another example, the ACR fingerprinting information may be used for advertisement or content augmentation and data collection. The overlay decision engine 210 and the ad targeter 212 (FIG. 2) may use the fingerprinting information to match the encoded content with contextually-relevant advertisements, informational and/or interactive content. The matched content and/or advertisements may then be provided to the media devices 115 for streaming display thereon. In another example, information about matching events may be communicated to a broadcast cloud for analysis of content matching.

In one example, the fingerprinter 305 may perform ACR fingerprinting upstream of broadcast distribution in the system. In another example, the fingerprinting may occur in the broadcast chain where broadcast feeds may be delivered for encoding/uploading. When a single broadcast feed is used, a number of devices and/or applications that may need to be purchased, installed, monitored, and maintained for ACR fingerprinting and encoding/uploading may be reduced. For example, capital expenses (CAPEX) and/or operational expenses (OPEX) may be reduced, such as a reduced system infrastructure (rack space, power, and Ethernet connectivity). Additionally, when a single broadcast feed is used, a number of broadcast feeds generated from a broadcaster's distribution amplifier may be reduced.

As discussed, the fingerprinter 305 may generate individual fingerprints from multimedia content, such as may pass through a broadcasting server, a headend, a switch, and/or a set-top box, in route to being displayed on one of the media devices 115. The fingerprints may include one frame or a number of frames. The frames may be taken in a sequential order with chronological time stamps, or may be taken at some interval such as every other (or every third frame), for example, still with corresponding time stamps.

The fingerprint sequence matcher 325 may process a set or sequence of these individual frames (as a query fingerprint) to match the frames to frame fingerprints (stored in the database 327) of original video content from which the corresponding video frames represented by these fingerprints originated. The frame fingerprints may be single frames and each include a corresponding time slot (or some kind of index such as a frame number or an amount of time from the beginning of the media program). Finding a match may result in determining the media program the user is watching on the media device 115, a channel or a channel change, a time slot of a schedule in terms of beginning and ending times of the program, commercial time slots, and such information of the matching media program or television channel.

To have confidence in the matching results, the fingerprint sequence matcher 325 may take advantage of the fact that the sequence of the fingerprint is ordered in time, and so the matching fingerprints not only belong to the same video, but are similarly ordered in time. The fingerprint sequence matcher 325 exploits this property to populate a binary tree structure chronologically across leaf nodes of the binary tree structure, and then to traverse a fully populated binary tree structure to detect a channel change, as will be explained in more detail.

The fingerprint sequence matcher 325 may also use such temporal properties of sequences of frames in a fingerprint to detect how a matching fingerprint sequence was played out (faster, slower, or in reverse). An algorithm in the ACR fingerprint sequence matcher 325 may be implemented to detect certain playback scenarios, such as, for example, normal speed at full frame rate, normal speed at 1/2 frame rate, normal speed at 1/3 frame rate, or the like.

Figure 4:
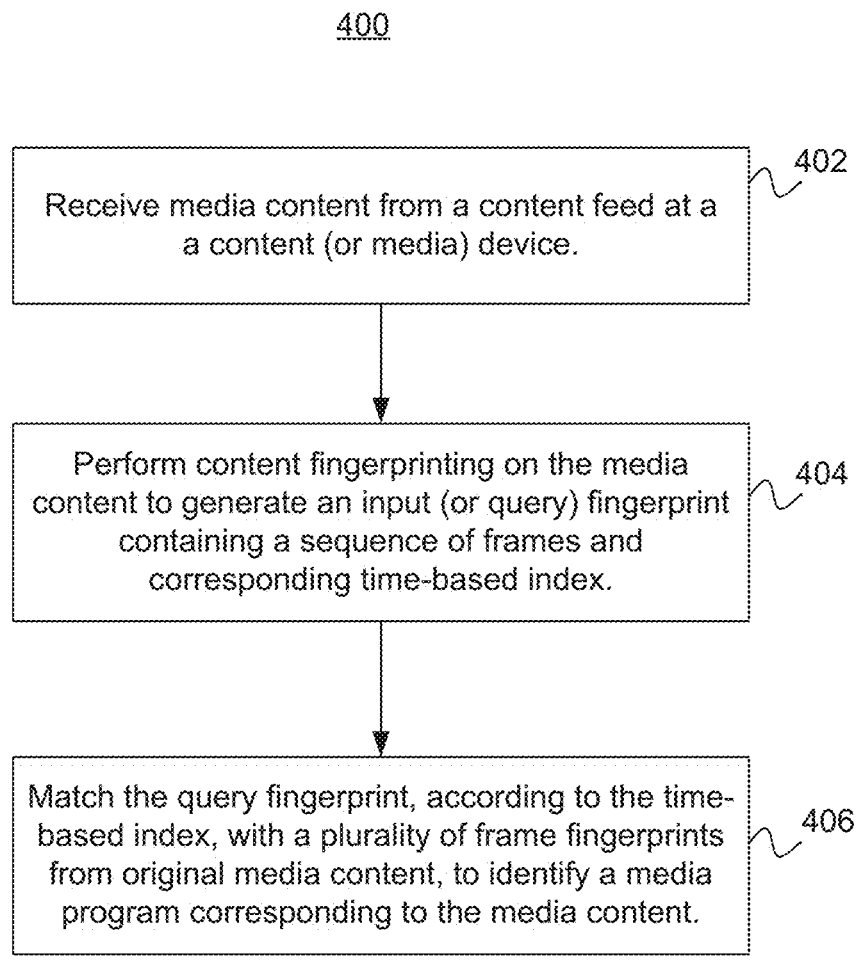
FIG. 4 illustrates a flowchart of a method of automatic content recognition (ACR) that matches a sequence of frames of an input (or query) fingerprint to identify a corresponding television program, according to one embodiment.

FIG. 4 illustrates a flowchart 400 of a method of automatic content recognition (ACR) that matches a sequence of frames of an input (or query) fingerprint to identify a corresponding television program, according to one embodiment. The method may be at least partially performed by processing logic that may include hardware (e.g., circuitry, dedicated logic, programmable logic, microcode, etc.), software (e.g., instructions executed by a processing device), firmware or a combination thereof. The method may be performed by processing logic of the client device such as client device 218 or 220, by a server system such as the ACR system 124 or 126 of FIG. 1 or the ACR system 224 or 226 of FIG. 2. The content manager 122 or 222 (FIGS. 1 and 2) may also play a part in executing the method. Alternatively, the method may be performed by other processing devices in various types of user device, portable devices, televisions, projectors, or other media devices.

Referring to FIG. 4, the processing logic begins with receiving media content from a content feed at a content (or media) device (402). The logic may continue to perform fingerprinting on the media content to generate an input (or query) fingerprint containing a sequence of frames and a corresponding time-based index (such as corresponding time stamps) (404). The logic may continue to match the query fingerprint, according to the time-based index, with a plurality of frame fingerprints from original media content, to identify a media program corresponding to the media content (406).

Figure 5:
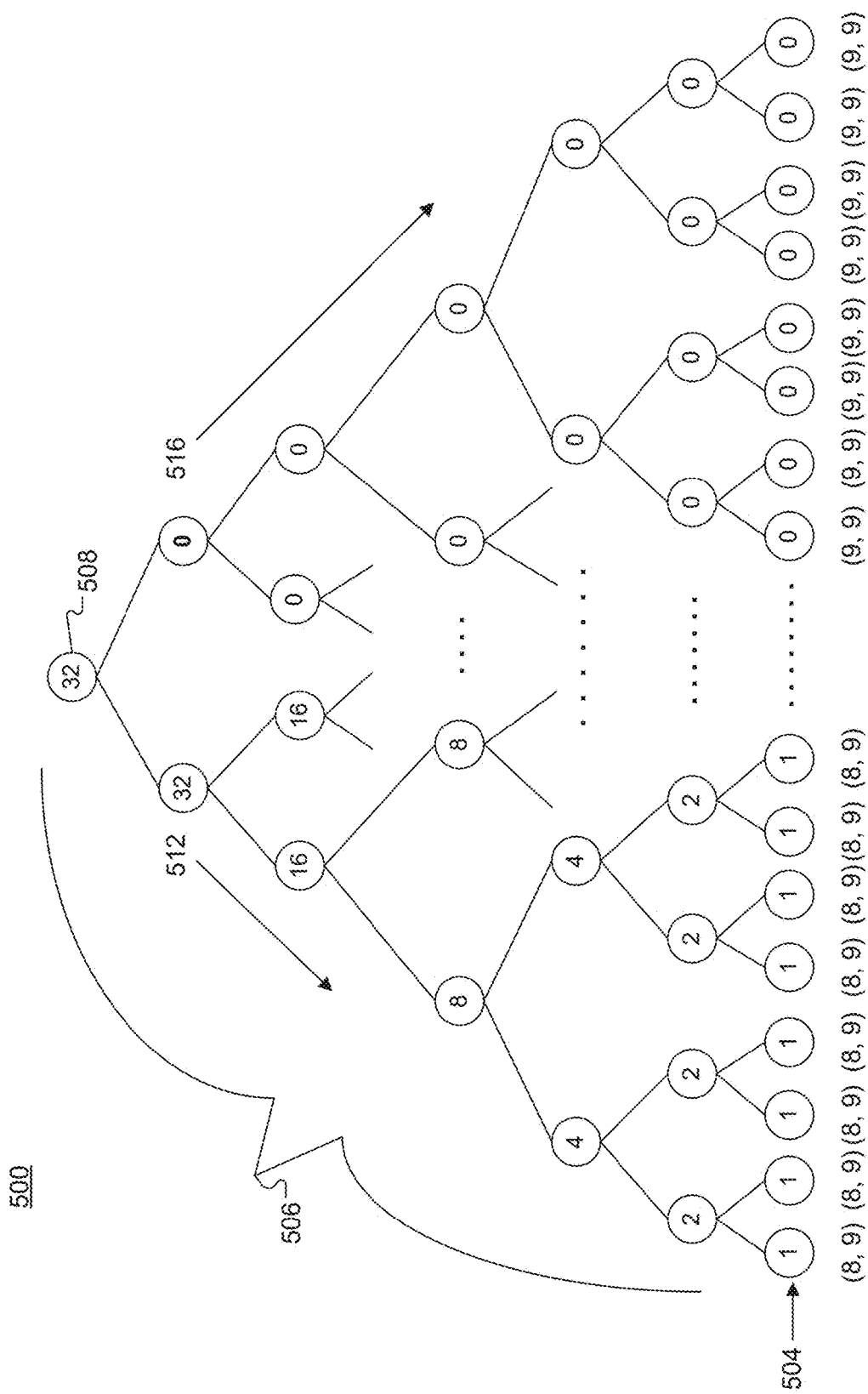
FIG. 5 is an example diagram of a populated binary tree structure indicating a channel change of a media device in the middle of a 64-frame query fingerprint.

FIG. 5 is an example diagram of a populated binary tree structure 500 indicating a channel change of a media device in the middle of a 64-frame query fingerprint. While the query fingerprint (or target block) and source block of frame fingerprints are shown herein as spanning 64 frames of source content, different sizes of target blocks and source blocks may be used, such as 32 frames or 128 frames, and other sizes being the power of two.

Traditional methods in which media frames are matched frame by frame may be by calculating a distance between the frames, and a match is found only when the distances are all zero between respective frames of a query fingerprint. As illustrated in FIG. 5, a binary tree structure may provide an alternative to this tradition method. For example, the ACR engine may populate leaf nodes 504 of the binary tree structure with the distances between respective frames of the query fingerprint and frame fingerprints of the source block from originating content. This population of the leaf nodes 504 may occur chronologically from left to right. In an alternative embodiment, the leaf nodes may be populated from right to left. The time stamps may aid the ACR engine (or other server) in making sure to match up the proper frames of target and source blocks and to populate the leaf nodes chronologically. A plurality of parent nodes 506 may then be populated with values from adding (or summing) the values of their respective children nodes. When a root node 508 contains a value within a threshold maximum number (such as a low number such as 8, 10, 12 or even zero), then the fingerprints may be said to match. Otherwise, there is no match.

More specifically, the example of FIG. 5 illustrates populating the binary tree structure 500 with distances where the target block indicates a channel change half-way through the 64 frames (e.g., at frame 33) from channel 8 to channel 9. The source block is channel 9 the whole time because it has already been streaming from channel 9 and the actual content arriving at the media device 115 has not yet caught up (thus catching the media device mid-way through a channel change). Although there is not room to show all 64 frames at the leaf nodes, the binary tree structure includes a left sub-tree 512 and a right sub-tree 516. The distances of "1" between all channels 8 and 9 through the first 32 frames get propagated up the binary tree structure, thus ending in a value of 32 at the root node of the left sub-tree and at the root node 508 of the entire binary tree structure. This creates the appearance of a mismatch, particularly with a threshold maximum number being relatively small.

But, because the channel was changed part-way through, the second half of the query fingerprint matches the frame fingerprints, resulting in distances of zero all the way along the right sub-tree 516. Because of this behavior within the binary tree structure, the ACR engine (or other server) may traverse the right sub-tree 516 and, upon identifying a zero at the first or second node of the right sub-tree, detect a channel change. (Note, if the binary tree was populated from right to left as indicated in an alternative embodiment, then traversal would be of the left sub-tree.) In another embodiment, the ACR engine may detect a low value below a threshold maximum distance (something greater than zero) to also signal a channel change. The new channel may be identified as the channel with media content matching the frames at the end of the query fingerprint, e.g., the ordered sequence of frames. This new channel may be associated with a content ID, as discussed, and be immediately used for content and ad targeting by the content manager 222. This advantageously avoids missing any overlay or replacement advertising opportunity following soon after the point the media device 115 starts to receive media content from the new channel (e.g., channel 9 in FIG. 5).

Figure 6:
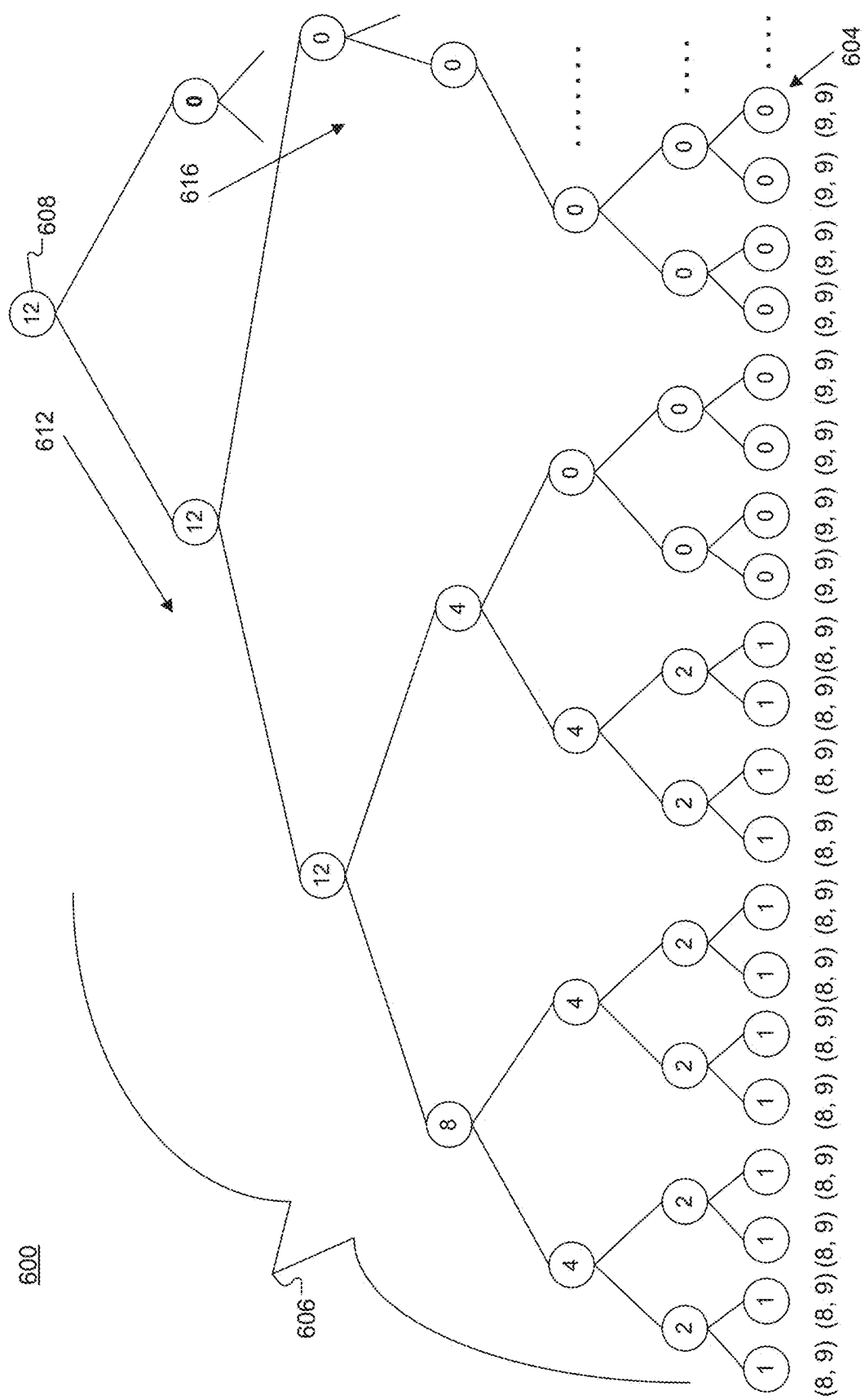
FIG. 6 is an example diagram of a populated binary tree structure indicating a channel change after 12 frames into a 64-frame query fingerprint.

FIG. 6 is an example diagram of a populated binary tree structure 600 indicating a channel change after 12 frames into a 64-frame query fingerprint. Within a plurality of leaf nodes 604, the channel is changed at the 13$^{th}$ node into the ordered sequence of frames of a current query fingerprint. A plurality of parent nodes 606 propagate distances up a left sub-tree 612 of the binary tree structure, ending in a smaller distance value of 12 at a root node 608. A value of 12, in one embodiment, may be low enough below a threshold maximum distance at the root node to be considered a match. In this case, the match will be with the current channel or program, designated as "9" in FIG. 6.

In another embodiment, however, the value of 12 at the root node may not be considered a match, and therefore, the ACR engine may continue traversing the binary tree structure 600 down a right sub-tree 616 of the binary tree structure, to determine whether there is a small enough distance (e.g., a threshold maximum value or below) at the first or second node of the right sub-tree to detect a channel change. The threshold maximum value may be zero or a relatively small value such as 8, 10, 12 or 16, for example.

Figure 7:
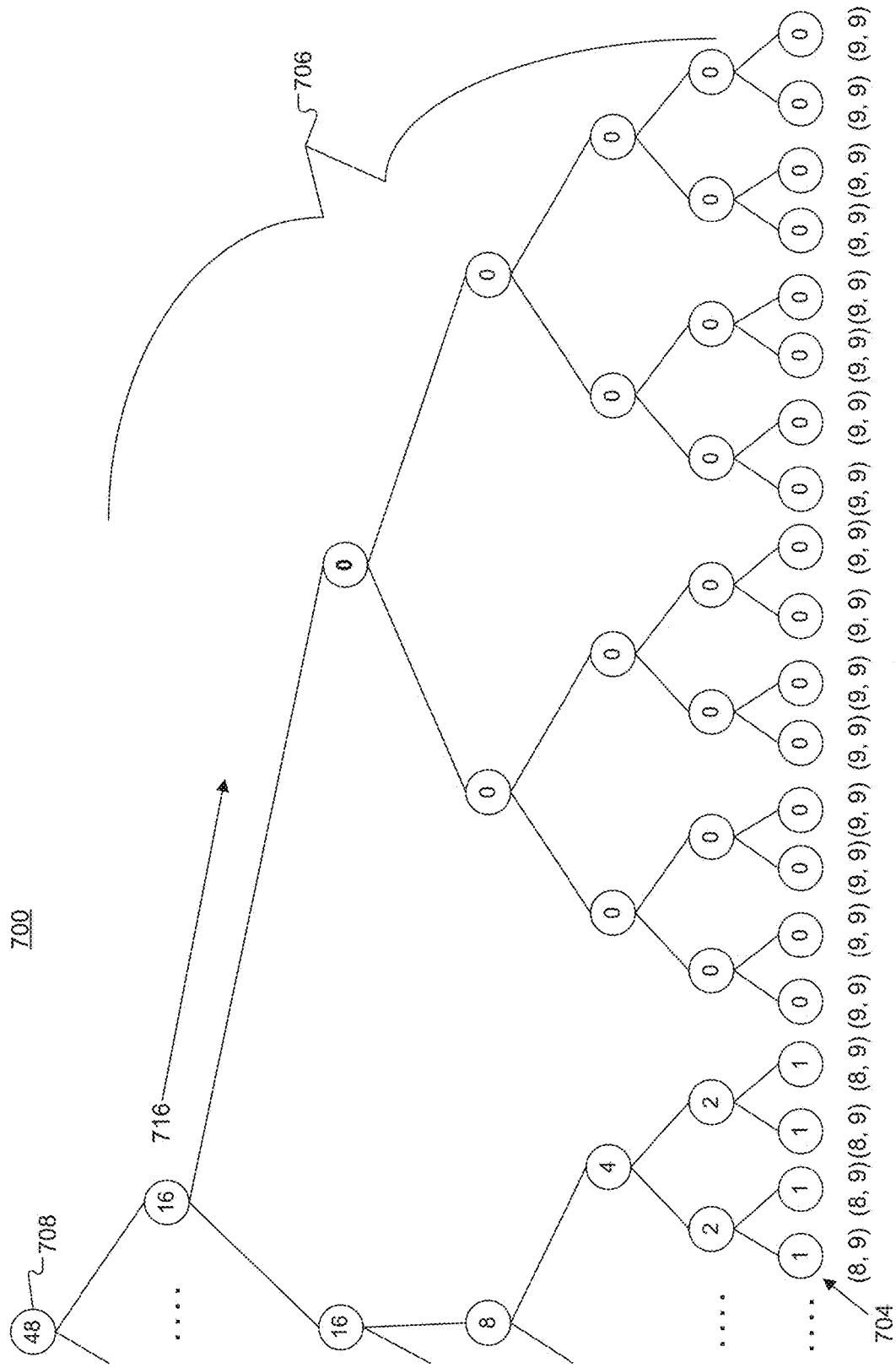
FIG. 7 is an example diagram of a populated binary tree structure indicating a channel change 16 frames from an end of a 64-frame query fingerprint.

FIG. 7 is an example diagram of a populated binary tree structure 700 indicating a channel change 16 frames from an end of a 64-frame query fingerprint. In this embodiment, the channel is changed at the media device from which the query fingerprint is generated at 17 frames before the end, providing less time in which to detect the channel change. Accordingly, a plurality of leaf nodes 706 are populated with distances of "1" until frame 16 the end, at which point streaming to the media device catches up to the channel change, resulting in a distance of zero. A plurality of parent nodes 706 propagate increasingly higher values of distances in the respective frames until a root node 708 takes on a distance value of 48.

A distance value of 48 reflects a mismatch between the query fingerprint and the originating content from the new television channel. But, according to the disclosed process, the ACR engine (server) may traverse a right sub-tree 716 of the binary tree structure and find a zero at not the first node, but at a second node down the right sub-tree 716. As discussed, instead of zero it may be detection of a low value (e.g., a threshold maximum value or below) to trigger detection of a channel change. So, although the root node 708 may indicate a mismatch, finding the zero (or a threshold low value) at the second node down the right sub-tree signals to the ACR engine a channel change. Advantageously, with knowing the new channel (or media program associated with the new channel), the ad targeter 212 and/or the ad server 230 may continue to target overlay or replacement media content to the media device 115 at which the channel changed, with no interruption or waiting for a channel change determination at the next query fingerprint.

Figure 8:
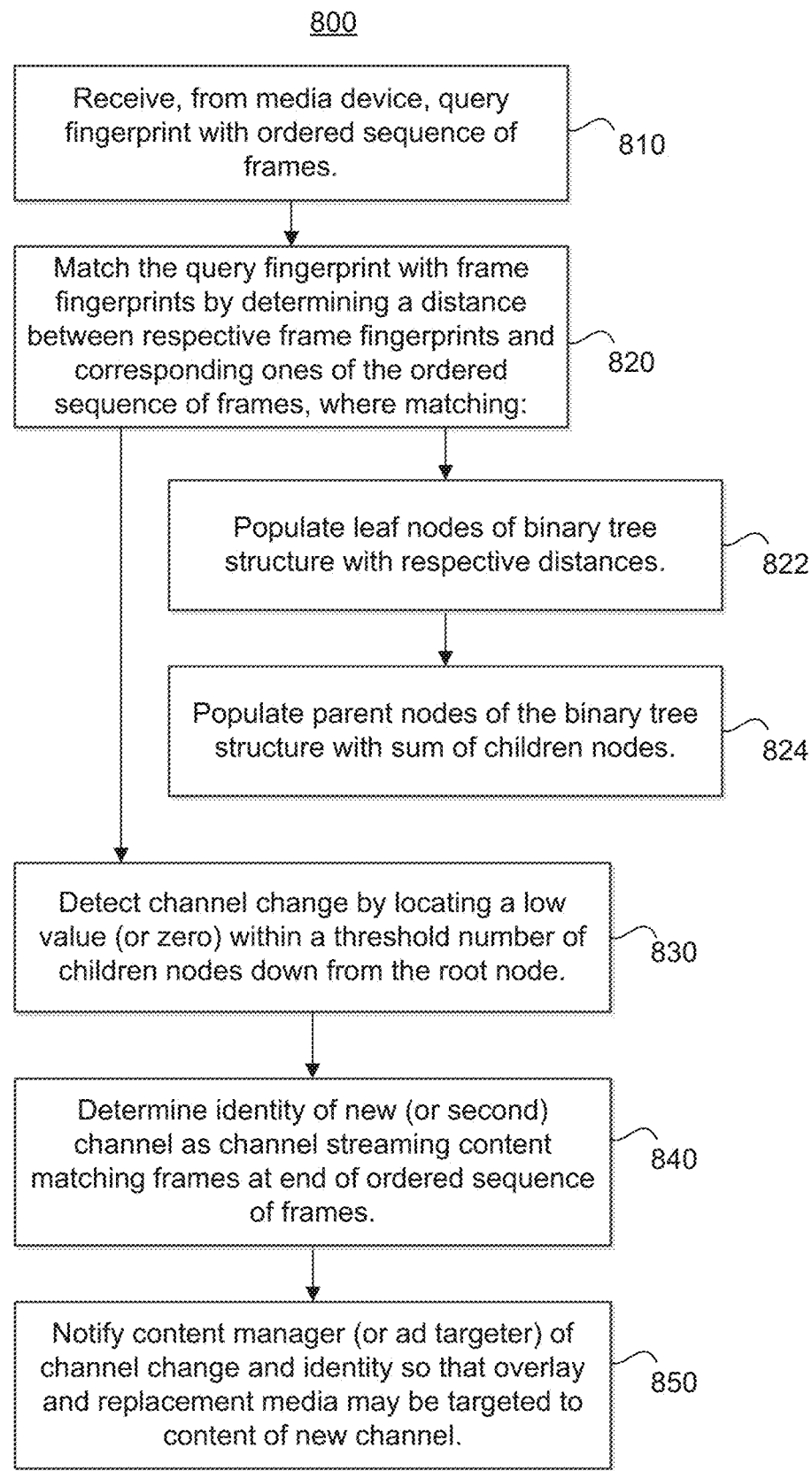
FIG. 8 illustrates a flowchart of a method of ACR that employs a binary tree structure to match fingerprints and to detect a channel change of a media device.

FIG. 8 illustrates a flowchart 800 of a method of ACR that employs a binary tree structure to match fingerprints and to detect a channel change of a media device. The method may be at least partially performed by processing logic that may include hardware (e.g., circuitry, dedicated logic, programmable logic, microcode, etc.), software (e.g., instructions executed by a processing device), firmware or a combination thereof. The method may be performed by processing logic of the client device such as client device 218 or 220, by a server system such as the ACR system 124 or 126 of FIG. 1 or the ACR system 224 or 226 of FIG. 2. The content manager 122 or 222 (FIGS. 1 and 2) may also play a part in executing the method. Alternatively, the method may be performed by other processing devices in various types of user device, portable devices, televisions, projectors, or other media devices.

Referring to FIG. 4, the processing logic begins with receiving, from a media device, a query fingerprint of content being consumed, the query fingerprint including an ordered sequence of frames (810). The processing logic may further match the query fingerprint with the plurality of frame fingerprints stored in the database by determining a distance between respective frame fingerprints and corresponding ones of the ordered sequence of frames (820). Matching may include a number of steps, but in one embodiment, matching may include to populate leaf nodes of the binary tree structure with values of the respective distances chronologically from left to right (822) and to populate parent nodes with values derived from adding value of children nodes connected to the parent nodes (824).

The processing logic may further detect a channel change from a first channel to a second channel responsive to locating a zero value within a threshold number of children nodes from a root node when traversing down the binary tree structure (830). The processing logic may further determine an identity of the second channel by identifying a channel streaming content with frames matching those at an end of the ordered sequence of frames of the query fingerprint (840). The processing logic may further notify an advertisement ("ad") targeter of the identity of the second channel being watched in response to detecting the channel change so that the ad targeter can adjust targeting media to content streamed to the second channel (850).

For example, the logic may send an identification of the media program to an advertising server and receive, from the advertising server, an advertisement contextually-relevant to a subject matter of the media program. The logic may then deliver the advertisement (or other content) to the media device for display as an overlay or as a replacement advertisement (or informational segment) during a commercial break in the media program.

Figure 9:
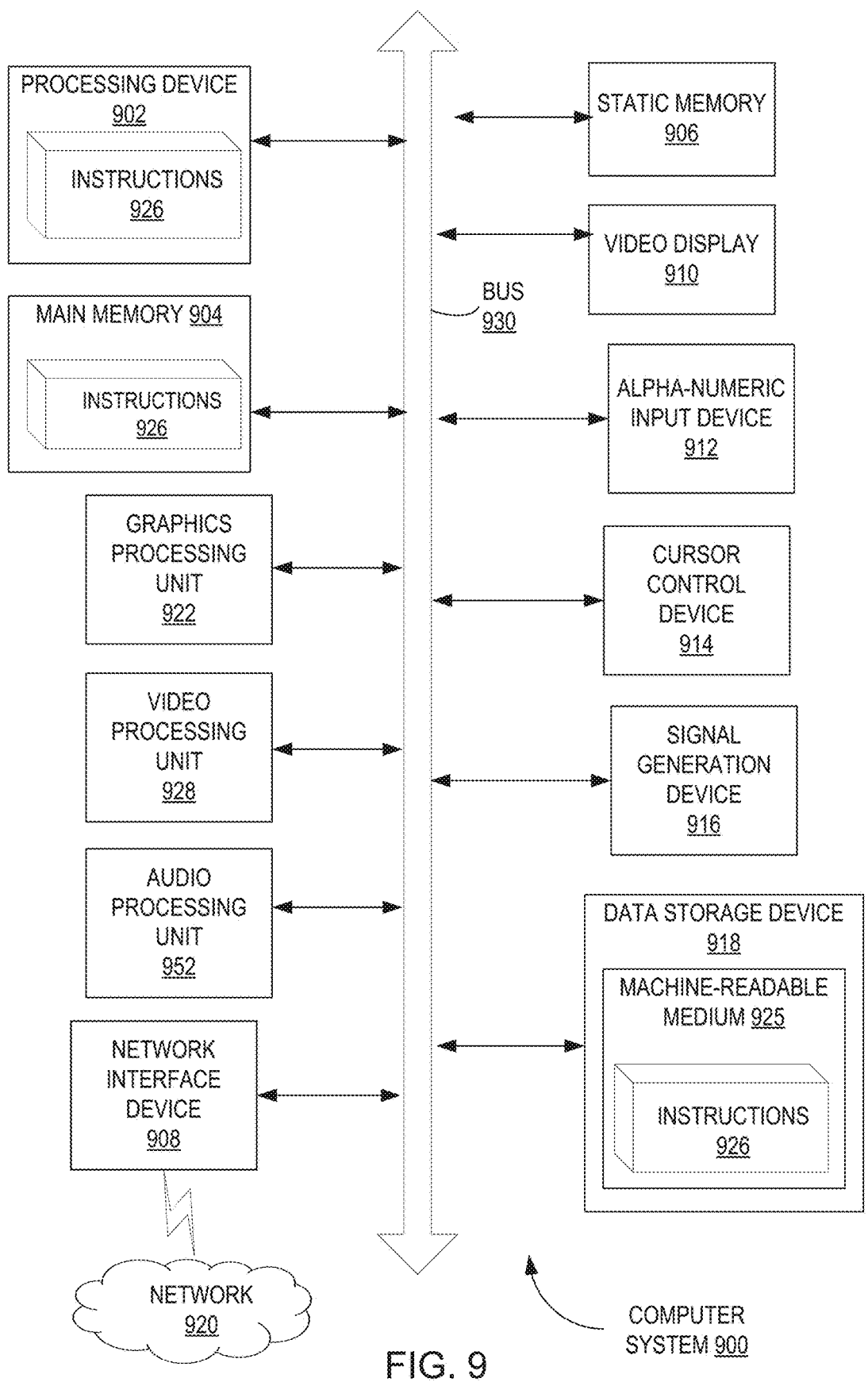
FIG. 9 illustrates a diagrammatic representation of a machine in the example form of a computer system within which a set of instructions, for causing the machine to perform any one or more of the methodologies discussed herein, may be executed.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 900 may correspond to the ACR system 124 or 126 of FIG. 1, to the ACR system 224 or 226 of FIGS. 2 and 3, or to the content manager 122 of FIG. 1 or the content manager 222 of FIG. 2. The computer system 900 may correspond to any media device 115 such as the client device 118 or 120 of FIG. 1. The computer system 900 may correspond to at least a portion of a cloud-based computer system.

The computer system 900 includes a processing device 902, a main memory 904 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. In one embodiment, processing device 902 may include one or more processing cores. The processing device 902 may execute the instructions 926 of a mirroring logic for performing the operations discussed herein.

The computer system 900 may further include a network interface device 908 communicably coupled to a network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a signal generation device 916 (e.g., a speaker), or other peripheral devices. Furthermore, computer system 900 may include a graphics processing unit 922, a video processing unit 928, and an audio processing unit 932. In another embodiment, the computer system 900 may include a chipset (not illustrated), which refers to a group of integrated circuits, or chips, that are designed to work with the processing device 902 and controls communications between the processing device 902 and external devices. For example, the chipset may be a set of chips on a motherboard that links the processing device 902 to very high-speed devices, such as main memory 904 and graphic controllers, as well as linking the processing device 902 to lower-speed peripheral buses of peripherals, such as USB, PCI or ISA buses.

The data storage device 918 may include a computer-readable storage medium 925 on which is stored instructions 926 embodying any one or more of the methodologies of functions described herein. The instructions 926 may also reside, completely or at least partially, within the main memory 904 and/or within the processing device 902 during execution thereof by the computer system 900; the main memory 904 and the processing device 902 also constituting computer-readable storage media.

The computer-readable storage medium 925 may also be used to store instructions 926 utilizing logic and/or a software library containing methods that call the above applications. While the computer-readable storage medium 925 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions 926 for execution by the machine and that cause the machine to perform any one or more of the methodologies of the present disclosure. The term "computer-readable storage medium" shall accordingly be taken to include, but not be limited to, solid-state memories, optical media, and magnetic media. The following examples pertain to further embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to secure memory repartitioning in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention may be applied to other types of circuits or semiconductor devices that may benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention may be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions may be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A system comprising:
Non-transitory computer-readable storage medium storing instructions and a database having a plurality of frame fingerprints associated with media programs being streamed to a plurality of channels; a processing device to execute the instructions to:
receive, from a media device, a query fingerprint of content being consumed, the query fingerprint including an ordered sequence of frames;
match the query fingerprint with the plurality of frame fingerprints stored in the database by determining a difference between respective frame fingerprints and corresponding ones of the ordered sequence of frames, wherein to match comprises to populate a binary tree structure with respective differences; and
detect a channel change of the media device from a first channel to a second channel responsive to locating a value, which is at or below a threshold maximum value, within a threshold number of children nodes from a root node upon traversing down the binary tree structure.

2. The system of claim 1, wherein to detect the channel change, the processing device to locate the value at a first node of one of a right or a left sub-tree positioned below the root node.

3. The system of claim 1, wherein to detect the channel change, the processing device to locate the value at a second node of a right or a left sub-tree positioned below the root node.

4. The system of claim 1, wherein to populate the binary tree structure with respective differences, the processing device further to:
populate leaf nodes of the binary tree structure with values of the respective differences chronologically from one side to an opposite side of the binary tree structure; and
populate parent nodes with values derived from adding values of children nodes connected to the parent nodes.

5. The system of claim 1, wherein the processing device further to determine an identity of the second channel by identifying a channel streaming content with frames matching those at an end of the ordered sequence of frames of the query fingerprint.

6. The system of claim 5, wherein the processing device further to notify an advertisement ("ad") targeter of the identity of the second channel being watched in response to detecting the channel change.

7. The system of claim 6, further comprising the ad targeter, wherein the ad targeter is further to:
send a notification of the channel change and the identity of the second channel to an ad server located across a network; and
receive, from the ad server, a replacement ad or overlay content to target commercial slots of the second channel.

8. A method comprising:
receiving, from a media device, a query fingerprint of content being consumed, the query fingerprint including an ordered sequence of frames;
matching, by a processing device of a computing system, the query fingerprint with a plurality of frame fingerprints stored in a database in memory by determining a difference between respective frame fingerprints and corresponding ones of the ordered sequence of frames, wherein the matching comprises populating a binary tree structure with respective differences; and
detecting, by the processing device, a channel change of the media device from a first channel to a second channel responsive to locating a value, which is at or below a threshold maximum value, within a threshold number of children nodes from a root node upon traversing down the binary tree structure.

9. The method of claim 8, wherein populating the binary tree structure with respective differences comprises:
populating leaf nodes of the binary tree structure with values of the respective differences chronologically from one side to an opposite side of the binary tree structure; and
populating parent nodes with values derived from adding values of children nodes connected to the parent nodes of the binary tree structure.

10. The method of claim 8, further comprising determining an identity of the second channel by identifying a channel streaming content with frames matching those at an end of the ordered sequence of frames of the query fingerprint.

11. The method of claim 10, further comprising:
notifying a content manager logic of the identity of the second channel being watched in response to detecting the channel change; and
targeting, by the content manager logic, advertising content streamed to the second channel.

12. The method of claim 8, wherein the threshold maximum value is sixteen or less.

13. The method of claim 8, wherein detecting the channel change comprises locating the value at a first node of one of a right or a left sub-tree positioned below the root node.

14. The method of claim 8, wherein detecting the channel change comprises locating the value at a second node of one of a right or a left sub-tree positioned below the root node.

15. A non-transitory computer-readable storage medium storing instructions, wherein the instructions are executable by a processing device to:
receive, from a media device, a query fingerprint of content being consumed, the query fingerprint including an ordered sequence of frames;
match the query fingerprint with a plurality of frame fingerprints stored in a database in memory by determining a difference between respective frame fingerprints and corresponding ones of the ordered sequence of frames, wherein the matching comprises populating a binary tree structure with respective differences; and
detect a channel change of the media device from a first channel to a second channel responsive to locating a value, which is at or below a threshold maximum value, within a threshold number of children nodes from a root node upon traversing down the binary tree structure.

16. The non-transitory computer-readable storage medium of claim 15, wherein to detect the channel change, the instructions further executable by the processing device to locate the value at one of a first node or a second node of one of a right or a left sub-tree positioned below the root node.

17. The non-transitory computer-readable storage medium of claim 15, wherein to populate the binary tree structure with respective differences, the instructions are further executable by the processing device to:
populate leaf nodes of the binary tree structure with values of the respective differences chronologically from one side to an opposite side of the binary tree structure; and
populate parent nodes with values derived from adding values of children nodes connected to the parent nodes.

18. The non-transitory computer-readable storage medium of claim 15, wherein the instructions are further executable by the processing device to determine an identity of the second channel by identifying a channel streaming content with frames matching those at an end of the ordered sequence of frames of the query fingerprint.

19. The non-transitory computer-readable storage medium of claim 18, wherein the instructions are further executable by the processing device to notify a content manager logic of the identity of the second channel being watched in response to detecting the channel change.

20. The non-transitory computer-readable storage medium of claim 19, wherein the instructions are further executable by the content manager logic to:
send a notification of the channel change and the identity of the second channel to an ad server located across a network; and
receive, from the ad server, a replacement ad or overlay content to target commercial slots of the second channel.

* * * * *